US006343863B1

(12) United States Patent
Wood

(10) Patent No.: US 6,343,863 B1
(45) Date of Patent: Feb. 5, 2002

(54) AIRCRAFT DISPLAY MOUNTING SYSTEM

(75) Inventor: Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/528,733

(22) Filed: Mar. 20, 2000

(51) Int. Cl.[7] .............................................. G03B 21/00
(52) U.S. Cl. ........................................ 353/13; 353/79
(58) Field of Search ............................. 353/11, 12, 13, 353/14, 79, 122; 434/43, 44

(56) References Cited

U.S. PATENT DOCUMENTS 5,548,356 A * 8/1996 Portman ..................... 353/13
6,072,444 A * 6/2000 Burns ........................ 353/13
6,224,218 B1 * 5/2001 Turner ....................... 353/13

* cited by examiner

Primary Examiner—William Dowling
(74) Attorney, Agent, or Firm—Nathan O. Jensen; Kyle Eppele

(57) ABSTRACT

A system is provided for mounting a head-up display in a cockpit of an aircraft, the cockpit including a front region and a back region, the head-up display including a computer adapted to process flight information, an optical unit adapted to project an image corresponding to the flight information processed by the computer, and a combiner adapted to display the image projected by the optical unit. The system comprises a frame with a front region and a back region, the frame including an optical unit interface for mounting the optical unit and a combiner interface for mounting the combiner, wherein the frame is adapted to be movably coupled to the cockpit such that the frame may be moved in a generally vertical direction between a plurality of positions relative to the cockpit. The system also includes at least one sensor coupled to the frame, wherein the sensor senses the position of the frame and provides a signal to the computer corresponding to the position of the frame so that the computer may adjust at least part of the image displayed on the combiner to correspond to the position of the frame.

26 Claims, 8 Drawing Sheets

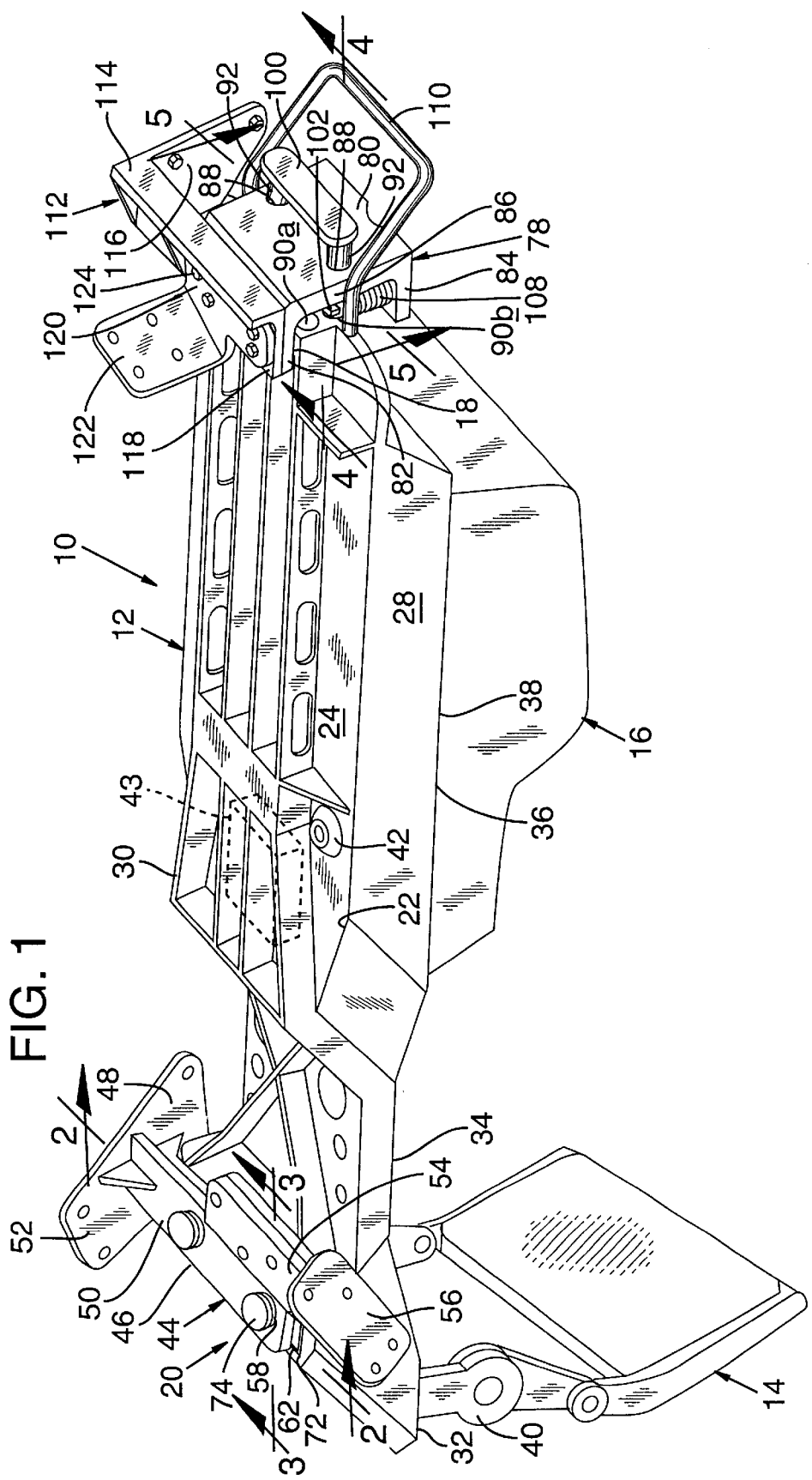

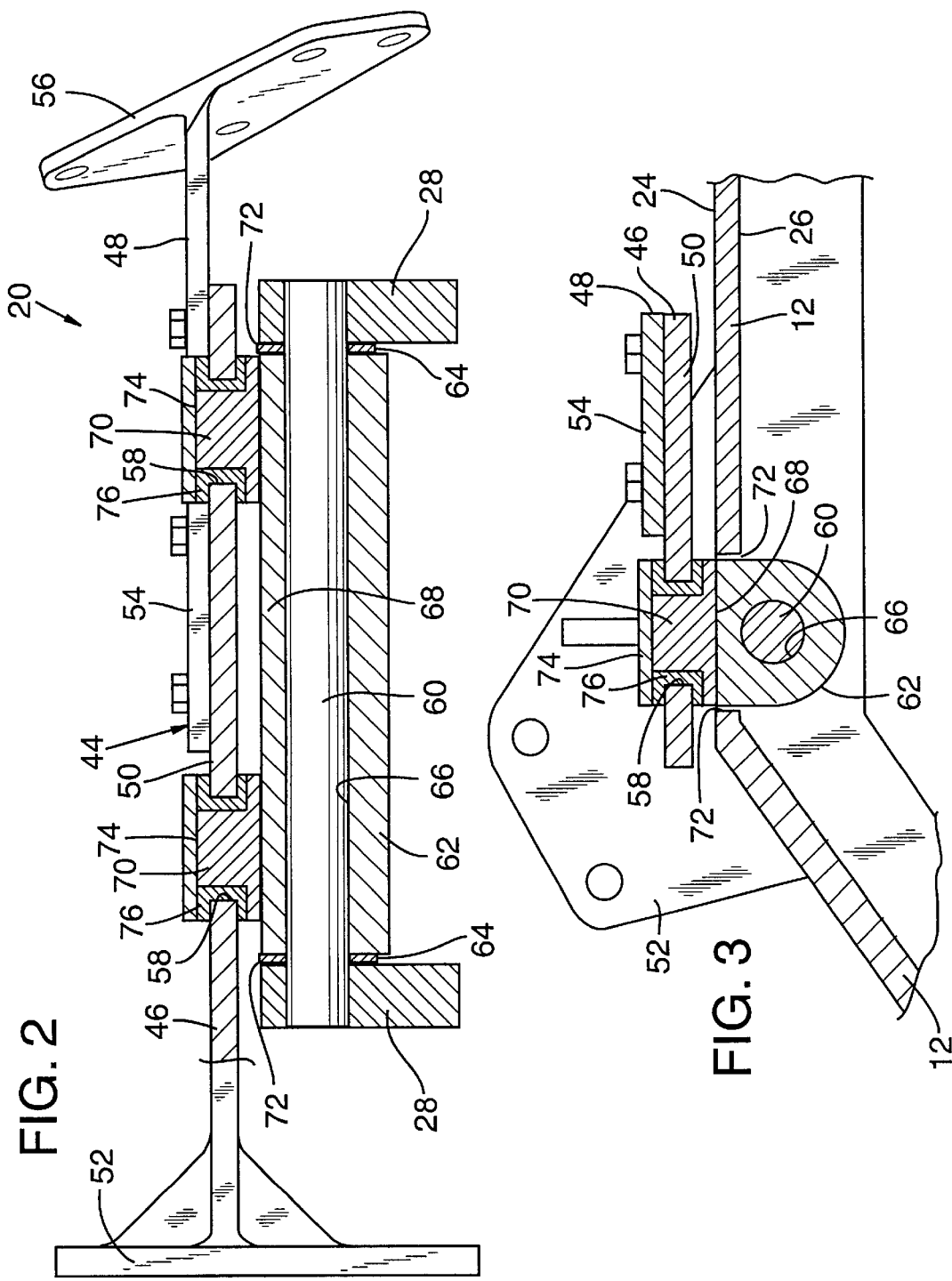

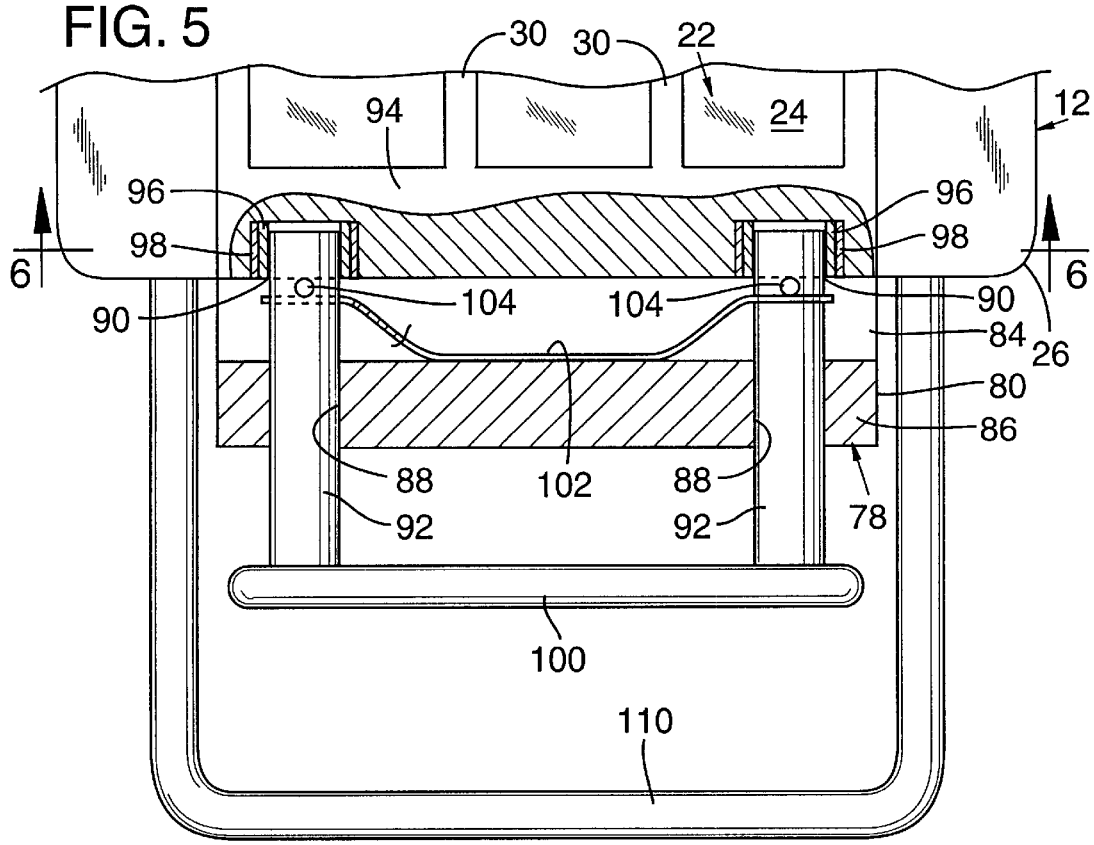
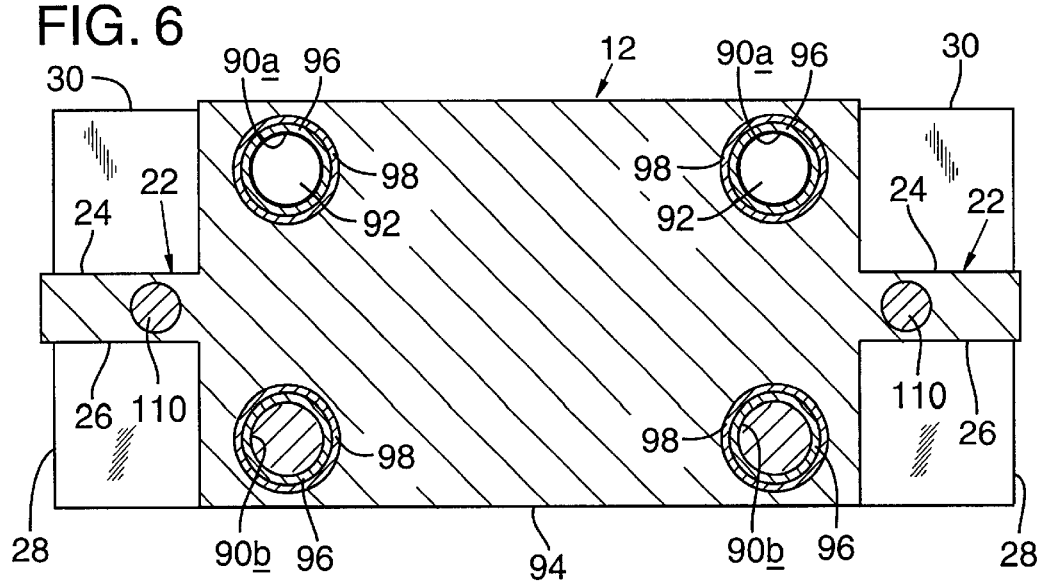

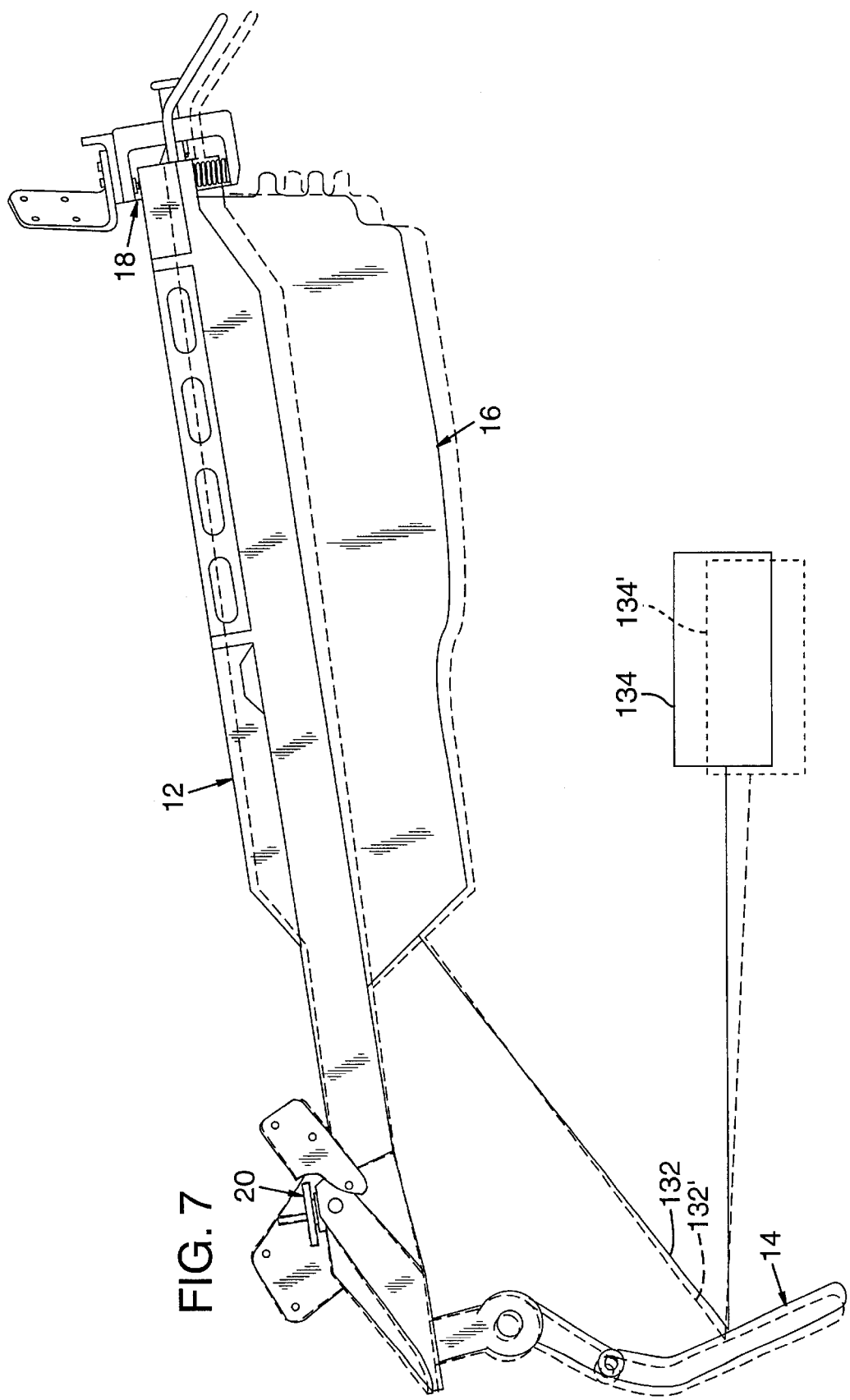

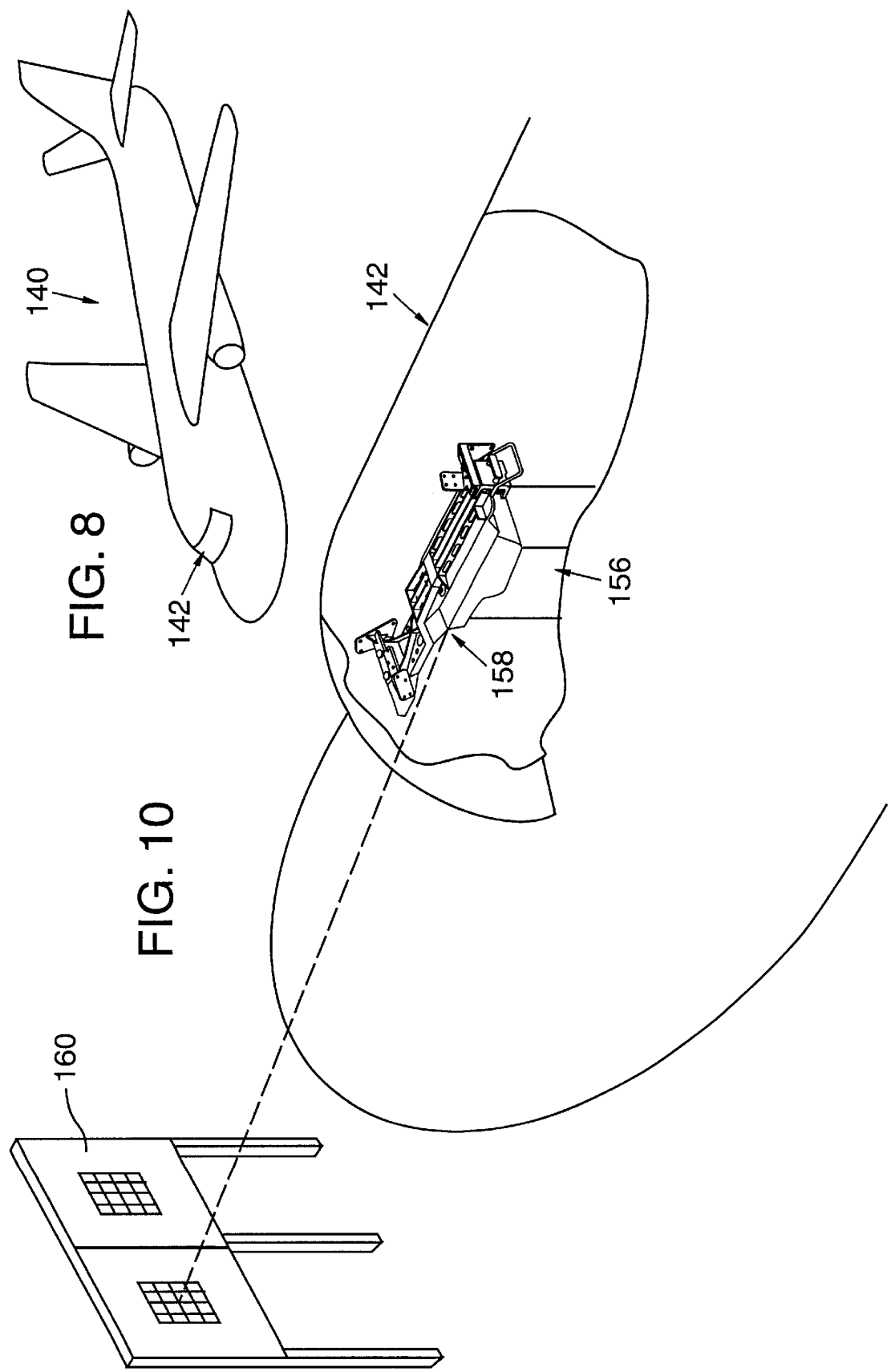

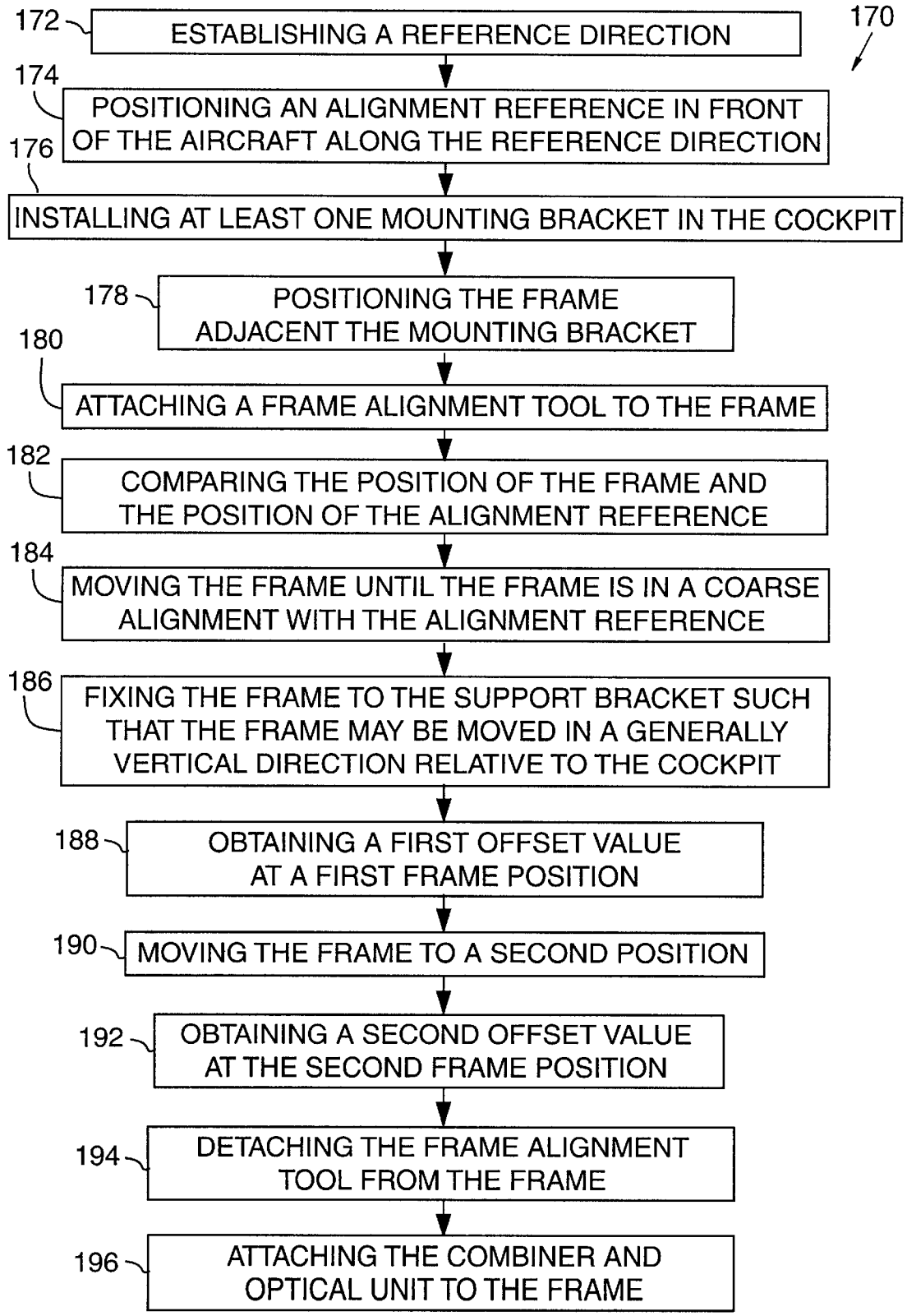

AIRCRAFT DISPLAY MOUNTING SYSTEM

BACKGROUND OF THE INVENTION

The present invention provides a system for mounting a head-up display system in the cockpit of an aircraft so that the display may be moved in a generally vertical direction between a plurality of positions to accommodate pilots of different heights.

Head-up displays, or HUDs, are displays that allow pilots to view critical flight information superimposed on the real world view out the front of the aircraft, rather than looking down at the instrument panel. HUDs typically have several components, including a computer, an overhead optical unit, and a combiner. The computer processes information input from various aircraft sensors and systems and outputs signals for display. The optical unit creates and projects an image of the processed information. It is generally mounted above the pilot's or copilot's seat, and typically includes a cathode-ray tube to create the image, electronics to drive the cathode ray tube, and a lens system to project the image onto the combiner. The combiner is an optically powered element positioned between the pilot's eyes and the aircraft windshield that reflects only a narrow band of light, and transmits most other wavelengths from the rear world to the pilot. Thus, it both reflects the image from the CRT toward the pilot and transmits light from outside the cockpit, combining the projected image with the view outside the cockpit. The combiner focuses the reflected display at infinity, so a pilot's eyes do not need to refocus when switching between the combiner display and the outside view, and there is no relative motion of the display with respect to the real world with head movement.

HUDs are becoming increasingly popular on all kinds of aircraft, including commercial, corporate and military aircraft, due to the wide variety of flight information that may be displayed. For example, while some HUDs simply repeat flight information already available on the instruments in the panel, others display complex flight path information calculated from inertial data generated by inertial laser reference sensors on the aircraft. Commonly displayed parameters include the boresight, or an extension of the aircraft longitudinal axis, the velocity vector, or the direction of the aircraft, the horizon, the actual and selected airspeeds, the ground speed, the actual and selected altitudes, the magnetic compass heading, and the pitch and roll of the aircraft.

Initially, HUDs were installed because they offered significant enhancements to aircraft capability. For example, delays and cancellations due to poor visibility are a significant cause of revenue loss for commercial airlines. Planes equipped with HUDs often qualify for lower visibility takeoffs and landings compared with non-equipped planes. Thus, these planes may have fewer weather delays and flight cancellations, and may reduce revenue losses due to weather. Similarly, military aircraft equipped with HUDs are able to fly missions in worse weather than non-equipped planes, thus offering both strategic and financial advantages in military applications.

More recently, HUDs are used to enhance aircraft safety by improving pilot situational awareness. For example, in takeoff and landing phases of flight, pilot situational awareness is increased through the use of HUDs. Furthermore, some newer HUDs include advanced features such as unusual attitude recovery symbology mode, tailstrike warnings and traffic-alert and collision avoidance capabilities to help a pilot avoid or recover from hazardous situations.

Because of the capability and safety enhancements offered, HUDs are being installed in many new aircraft and retrofitted in many existing aircraft. The HUD information is visible from within a volume of space known as the eyebox. To achieve the maximum safety and capability benefits, the HUDs generally should be installed in a cockpit so that the eyebox is centered at the cockpit design eye point, or the DEP. The DEP is an ergonomically determined eye position that is the optimal location in the cockpit for viewing both instruments and objects outside of the plane through the windshield. Thus, positioning the HUD eyebox at the DEP helps to optimize the pilot's view of the HUD while not compromising the view of both the outside world and the instruments on the panel.

Generally, aircraft cockpits are designed with adjustable seats so pilots of different heights can locate themselves at the DEP. Moreover, some older aircraft were not designed to accommodate the full range of male and female pilot populations. In some cases, seats may not travel far enough up or down to position the pilot's eye close enough to the DEP for the pilot to be centered within the HUD eyebox. A pilot that is not able to reach the center of the HUD eyebox will not be able to view all of the HUD display without head motion, and will not be able to take full advantage of the safety benefits offered by the HUD. This limits the number of pilots that may operate the aircraft using the HUD, and thus lowers the capability of the aircraft. Furthermore, some modern aircraft use HUDs as the primary flight display in the aircraft. Pilots who cannot reach the eyebox may be restricted from flying these planes.

One solution to this problem is to replace the cockpit seats with seats that have a greater range of height adjustment. However, this method can pose problems when retrofitting older planes with HUD equipment. For example, the yokes and rudder pedals in many older planes are designed to accommodate the range of heights of the seats originally installed in the plane. If seats with a greater range of heights are installed, the yokes and pedals may have to be moved or replaced to accommodate the greater range, significantly increasing the cost of the retrofit.

Therefore, there remains a need for a system for installing a head-up display system in an aircraft cockpit that allows the display system to be viewed by pilots of a wide range of heights, yet does not require expensive modifications to the aircraft cockpit.

SUMMARY OF THE INVENTION

One aspect of the present invention provides a system for mounting a head-up display in a cockpit of an aircraft, the cockpit including a front region and a back region, the head-up display including a computer adapted to process flight information, an optical unit adapted to project an image corresponding to the flight information processed by the computer, and a combiner adapted to display the image projected by the optical unit. The system comprises a frame with a front region and a back region, the frame including an optical unit interface for mounting the optical unit and a combiner interface for mounting the combiner, wherein the frame is adapted to be movably coupled to the cockpit such that the frame may be moved in a generally vertical direction between a plurality of positions relative to the cockpit. The system also includes at least one sensor coupled to the frame, wherein the sensor senses the position of the frame and provides a signal to the computer corresponding to the position of the frame so that the computer may adjust at least part of the image displayed on the combiner to correspond to the position of the frame.

Another aspect of the invention provides an aircraft, the aircraft including a cockpit and the cockpit including a head-up display system. The head-up display system comprises a frame movably mounted to the aircraft in the cockpit, wherein the frame may be moved in a generally vertical direction between a plurality of positions relative to the cockpit, a computer disposed in the aircraft, wherein the computer is configured to process aircraft flight data, an optical unit mounted to the frame, wherein the optical unit is configured to project an image corresponding to the processed flight data, and a combiner mounted to the frame, wherein the combiner is adapted to display the image projected by the optical unit. The head-up display system also includes at least one sensor coupled to the frame, wherein the sensor is adapted to sense the position of the frame and to provide a signal to the computer so that the computer may adjust the image to correspond to the position of the frame.

Yet another aspect of the present invention provides a method of installing a head-up display unit in a cockpit of an aircraft, the display unit including a frame, an optical unit for projecting an image of flight information, a combiner for displaying the image, and a computer, and the frame including a movable coupling structure and at least one electronic offset circuit to characterize a frame offset. The method comprises (1) establishing a reference direction for the head-up display; (2) positioning an alignment reference such that the alignment reference is in a position in front of the aircraft along the reference direction; (3) installing at least one mounting bracket in the cockpit; (4) positioning the frame in the mounting bracket such that the movable coupling structure is at a position adjacent the mounting bracket; (5) attaching a frame alignment tool to the frame; (6) comparing the position of the frame and the position of the alignment reference using the frame alignment tool; (7) moving the frame until the frame is in a coarse alignment with the alignment reference; (8) fixing the movable coupling structure to the support bracket such the frame may be moved in a generally vertical direction between a plurality of vertical positions relative to the cockpit, but may not be moved in other directions; (9) obtaining a first offset value that characterizes a misalignment of the frame relative to the boresight direction while the frame is in a first vertical position, and adjusting the offset circuit to correspond to the first offset valve; (10) storing the first offset valve in the computer; (11) moving the frame to a second position; (12) obtaining a second offset value that characterizes the misalignment of the frame at the second vertical position and adjusting the offset circuit to correspond to the second offset valve; (13) storing the second offset valve in the computer; (14) detaching the frame alignment tool from the frame; and (15) attaching the combiner and optical unit to the frame.

BRIEF DESCRIPTION OF THE DRAWINGS

FIG. 1 is a perspective view of a system for mounting a head-up display according to a first embodiment of the present invention.

FIG. 2 is a side sectional view of a movable mounting structure of the embodiment of FIG. 1 taken along line 2—2 of FIG. 1.

FIG. 3 is a partially sectioned front view of the movable mounting structure of the embodiment of FIG. 1 taken along line 3—3 of FIG. 1.

FIG. 5 is a partially sectioned top view of the locking structure and sensor of the embodiment of FIG. 1 taken along line 5—5 of FIG. 1.

FIG. 6 is a rear sectional view of the locking structure of the embodiment of FIG. 1 taken along line 6—6 of Pig. 5.

FIG. 7 is a schematic representation of the optical path of a light ray in an HUD mounted to the embodiment of FIG. 1 before and after moving the system between positions.

FIG. 8 is a perspective view of an aircraft according to an embodiment of another aspect of the present invention.

FIG. 10 is a schematic representation of an alignment tool and alignment target that may be used to install and align a system of the present invention.

FIG. 11 is a flow diagram of a method for installing a system of the present invention.

DETAILED DESCRIPTION OF THE PREFERRED EMBODIMENTS

Figure 4:
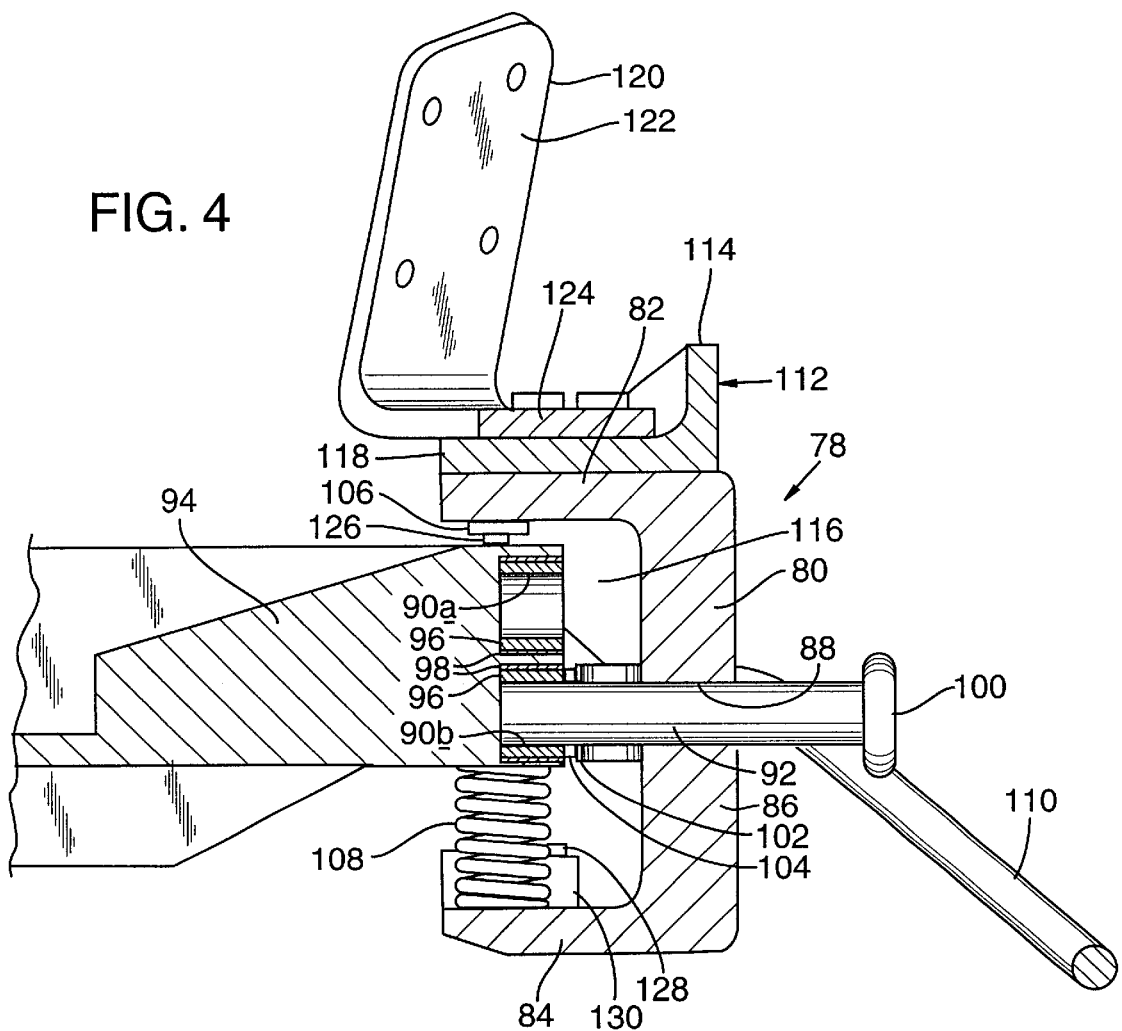
FIG. 4 is a partially sectioned side view of a locking structure and a sensor of the embodiment of FIG. 1 taken along line 4—4 of FIG. 1.

The present invention provides a system for mounting an optical system (and a combiner) of an HUD system in the cockpit of an aircraft that allows the position of the system to be varied so that it is viewable by pilots of widely varying heights. The system is particularly suited for retrofitting older aircraft with HUD systems, as it achieves this flexibility without extensive cockpit modifications. One embodiment of the invention is shown in FIG. 1 as a system 10 including an HUD mounting tray or frame 12 that may be mounted to the airplane cockpit structure to support a combiner 14 and an optical unit 16 of an HUD system. Frame 12 is adapted to be movably mounted to a cockpit so that it may be moved between a plurality of positions in a generally vertical direction relative to the cockpit of the aircraft, permitting a pilot to choose a position that best suits the pilot's sitting height eye level. System 10 also includes at least one sensor 18 to sense the position of frame 12 and to provide a signal to the HUD computer corresponding to the position of frame 12 so that the computer may adjust any flight information displayed on combiner 12 that is sensitive to the position of frame 12. Additionally, system 10 may include a movable coupling structure 20 adapted for movably attaching frame 12 to a part of the aircraft cockpit structure.

Frame 12 provides a structure to which both combiner 14 and optical unit 16 may be mounted. In the preferred embodiment, frame 12 has an elongate, tray-like shape, including a generally planar central portion 22 with a top surface 24 and a bottom surface 26, and downwardly extending side portions 28. Side portions 28 strengthen central portion 22, helping to maintain optical alignment between the overhead optical unit and the combiner and to prevent central portion 22 from bending or buckling when optical unit 16 is mounted to frame 12. One or more ribs 30 may be formed on top surface 24 of central portion 22 to provide additional strength to frame 12. Frame 12 is generally made from a lightweight, stiff material that is resistant to damage and oxidation. A preferred material is cast aluminum. The dimensions of frame 12 may be designed to suit any desired cockpit and HUD geometries.

Because the combiner acts as a reflective optical element that focuses the image projected by the optical unit at infinity, it is desirable that the positions of combiner 14 and optical unit 16 remain fixed relative to one another when frame 12 is moved between positions. If the distance between combiner 14 and optical unit 16, or the angle at which light from optical unit 12 meets combiner 14, is changed, the focal point of the image reflected from the combiner may be changed, and the HUD may not function as designed. Thus, both combiner 14 and optical unit 16 are mounted to frame 12 such that combiner 14 and optical unit 16 remain fixed relative to one another during frame movement. Frame 12 includes a combiner interface 32 disposed adjacent a front region 34 of frame 12 for mounting combiner 14, and an optical unit interface 36 disposed adjacent a back region 38 of frame 12 for mounting optical unit 16. The spacing of combiner interface 32 and optical unit interface 36 is determined by the optics of the HUD for which frame 12 is designed. Any suitable method of attaching combiner 14 to combiner interface 32 may be used. In the preferred embodiment, combiner 12 is pivotally attached to frame 14 with pivotal mounts 40 that are bolted to frame 14 so that combiner may be pivoted out of the pilot's view when not in use. Similarly, optical unit 16 may be attached to optical unit interface 36 in any desired fashion. In the preferred embodiment, one or more receptacles 42 corresponding to the locations of connectors on optical unit 16 are formed in central portion 22 of frame 12. Receptacles 42 may include captive bolts to fasten optical unit 16 to frame 12. Finally, an offset circuit 43 may be included on frame 12. Offset circuit 43 includes electrical attachment points that may be attached to optical unit 16 so that offset circuit 43 may provide an offset signal to correct for any misalignment of frame 12 with respect to the boresight axis of the aircraft.

System 10 may include a movable coupling structure 20 for coupling frame 12 to an aircraft cockpit. Any suitable coupling structure 20 may be used, as long as coupling structure 20 permits frame 12 to be moved in a generally vertical direction relative to the cockpit, but prevents movement in other directions. In the preferred embodiment, shown in detail in FIGS. 2-3, coupling structure 20 is adapted to pivotally couple frame 12 to the cockpit so that frame 12 may be pivoted between positions. Coupling structure 20 of the preferred embodiment includes a front mounting bracket 44 configured to mount the front region of frame 12 to the structural frame of the aircraft. Front mounting bracket 44 includes two pieces, first bracket piece 46 and second bracket piece 48. First bracket piece 46 includes a frame-coupling portion 50 that is roughly coplanar with top surface 24 of frame 12, and an aircraft-coupling portion 52 that extends upward at an angle from frame-coupling portion 50 to couple to a structural member in the aircraft skeleton. The geometry of and location of structural members within a particular aircraft determine the size and shape of aircraft-coupling portion 52. Aircraft-coupling portion 52 may be attached to the aircraft structural member by any suitable means, such as with bolts. Similarly, second bracket piece 48 includes a frame-coupling portion 54 that is bolted to the top surface of first bracket piece 46, and an aircraft-coupling portion 56 for mounting to a structural member of the airplane. Front mounting bracket 44 also includes one or more receptacles 58 for coupling frame 12 to front mounting bracket 44. In the preferred embodiment, receptacles 58 include holes formed in first bracket piece 46.

Frame 12 is attached to front mounting bracket 44 by a pivot bar 60. Pivot bar 60 is fixed between side portions 28 of frame 12 adjacent front region 34 of frame 12, and is spaced from bottom surface 26 of frame 12. A yoke 62 is disposed within frame 12. Yoke 62 preferably has a solid construction, and includes a hole 66 through which pivot bar 60 extends. The diameter of hole 66 precisely fits the outer diameter of pivot bar 62. A thrust washer 64 is positioned between each side of yoke 62 and frame 12 to make the fit of yoke 64 within frame 12 as tight as possible, and to reduce friction between yoke 62 and frame 12 as frame 12 is pivoted. Yoke 62 also has a top surface 68. One or more coupling devices, such as bushings 70, extend upward from top surface 68 of yoke 62, through an aperture 72 formed in frame 12 beneath mounting bracket 44, and through receptacles 58 in mounting bracket 44. A cap 74 is attached to the top of each bushing 70 after bushings 70 are inserted through receptacles 58. The outer diameter of cap 74 is greater than the diameter of receptacle 58, so once caps 74 are attached to bushings 70, bushings 70 may not be removed from receptacles 58 without removing cap 74.

To allow the position of frame 12 to be adjusted during installation, bushings 70 may have a somewhat smaller diameter than receptacles 58 to provide frame 12 with some horizontal play. Similarly, the distance between cap 74 and the top of yoke 62 may be somewhat greater than the thickness of mounting bracket 44 so that the position of frame 12 has some vertical play. The amount of play allowed in each direction may be chosen based upon such factors as the desired installation procedures and the amount of structural variation anticipated in a particular aircraft for which system 10 is designed. In the preferred embodiment, bushings 70 have 0.15 inch of play in each direction when centered in receptacles 58. However, either more or less play may also be provided. Once bushings 70 are fixed within receptacles 58 with caps 74, the pitch, yaw and roll of frame 12 may be adjusted through an optimization process described in more detail below. After the position of frame 12 has been adjusted, bushings 70 may be fixed in the optimized positions in receptacles 58 with a suitable epoxy 76. Examples of suitable epoxies include HYSOL aerospace epoxies, manufactured by Dexter Adhesive and Coating Systems, Inc. Though the pivotal attachment is located adjacent front region 34 of frame 12 in the preferred embodiment, it may also be positioned at any other position on frame 12 desired.

System 10 may also include a locking structure 78 to lock the frame in each position. Any suitable mechanism for locking the frame may be used. One example of a suitable locking structure 78 is shown in FIGS. 4–6. Locking structure 78 includes a U-shaped bracket 80 with a top portion 82, a bottom portion 84 and a central portion 86. At least one hole 88 is formed through central portion 86 of U-shaped bracket 80, and a series of corresponding positioning recesses or holes 90 are formed in the back of frame 12 in a vertical alignment with one another. Frame 12 may be moved until bracket hole 88 is aligned with one of positioning holes 90, and a pin 92 may be moved to a locking position by inserting pin 92 through bracket hole 88 and into positioning hole 90 to fix frame 12 in that position. Likewise, frame 12 may be unlocked by withdrawing pin 92 out of positioning hole 90 to an unlocked position. In the preferred embodiment, two bracket holes 88 are formed in U-shaped bracket 80, and two corresponding sets of vertically aligned positioning holes 90 are formed in the back of frame 12. Thus, two pins 92 hold frame 12 in each position, increasing the lateral stability of frame 12.

The number of positioning holes 90 in each vertically aligned set corresponds to the number of positions in which frame 12 may be fixed. In the preferred embodiment, each set of vertically aligned positioning holes includes two holes, upper hole 90a and lower hole 90b, providing frame 12 with two positions. Depending upon how many holes 90 are in each vertically aligned set, a thicker region 94 may need to be formed in the back region 38 of frame 12 to accommodate the desired number of positioning holes 90.

Positioning holes 90 provide another point at which the alignment of frame 12 may be adjusted during the installation process. Positioning holes 90 have a larger diameter than the outer diameter of pins 92. Therefore, to provide an exact fit with pins 92, inserts 96 with an inner diameter that precisely fits the diameter of pins 92 are placed in positioning holes 90. Inserts 96 are fixed in positioning holes 90 as follows. First, frame 12 is moved into a desired position. Then, inserts 96 are placed in the corresponding positioning holes 90, and pins 92 are extended into inserts 96. Next, frame 12 is aligned following a procedure described in more detail below. Finally, after frame 12 is aligned, a suitable epoxy 98 is injected into the space between inserts 96 and the sides of positioning holes 90 to fix inserts 96 in place. Preferred epoxies 98 for fixing inserts 96 include anaerobic epoxies, as little oxygen reaches epoxy deep in holes 90. A particularly preferred epoxy is a LOCTITE 600 Series epoxy manufactured by the Loctite Corporation.

System 10 may also include various features to facilitate the movement of frame 12 between positions. For example, in the preferred embodiment, a pin handle 100 may be attached to the back of pins 92 so that a user can simultaneously pull both pins 92 from engagement with frame 12 by pulling pin handle 100. Also, a mechanism may be provided to urge pins 92 into positioning holes 90. For example, in the preferred embodiment, a tensioning member such as a leaf spring 102 may be positioned between frame 12 and U-shaped bracket 80 to push pins 92 into holes 90. Leaf spring 102 stretches between the two pins 92, and is held in position by shoulders 104 on pins 92. The apex of leaf spring 98 rests against the inside surface of U-shaped bracket 80 so that leaf spring 98 is flattened when handle 96 is pulled. Top portion of U-shaped bracket 82 may include a stop 106 to limit the distance frame 12 can be pivoted, and bottom portion 84 may include a similar feature if desired. A counterbalance, such as one or more compression springs 108 disposed between bottom surface 26 of frame 12 and bottom portion 84 of U-shaped bracket 80, may be used to facilitate the movement of frame 12 to higher positions. Finally, a frame handle 110 may be attached to frame 12 to provide a convenient place to grip frame 12 when moving frame 12 between positions. In addition to these features, any other features designed to facilitate the movement of frame 12 between positions may be included in system 10 without departing from the scope of the present invention.

System 10 may include a second mounting bracket to couple locking structure 78 to the cockpit at a second location. An example of a suitable second mounting bracket is rear mounting bracket 112. Rear mounting bracket 112 includes a first rear bracket piece 114 having aircraft-coupling portion 116 and a frame-coupling portion 118, and a second rear bracket piece 120 also having an aircraft-coupling portion 122 and a frame-coupling portion 124. Aircraft-coupling portions 116 and 122 may be attached to an airplane frame member by any suitable means, such as with bolts. Similarly, frame-coupling portions 118 and 124 of rear mounting bracket 112 may be coupled to frame 12 by any suitable means. In the preferred embodiment, first rear bracket piece 114 is attached to the top of second rear bracket piece 120, and second rear bracket piece 120 is attached to top portion 82 of U-shaped bracket 80. Frame 12 is thus coupled to the cockpit by U-shaped bracket 80 and rear mounting bracket 112.

System 10 includes at least one sensor 18 for detecting the position of frame 12. The accuracy of some flight information displayed on combiner 14, such as the horizon and boresight symbols, may be sensitive to the position of the image on combiner 14 relative to the features outside the cockpit. To adjust for the shift of these symbols when frame 12 is moved, sensor 18 senses the position of frame 12 and provides a signal to the HUD computer corresponding to the position of frame 12. The computer then adds the appropriate offset to the symbols to align the symbols with the true aircraft boresight axis and horizon. The appropriate offset for each position may be determined in any suitable fashion. In the preferred embodiment, the appropriate offsets for each position are empirically determined during the installation process and stored either in the HUD computer memory or offset circuit 43.

Sensor 18 may be located at any position within the aircraft cockpit from which it may detect the position of frame 12, as long as sensor 18 is coupled to frame 12 in some manner. For instance, if an optical sensor is used, sensor 18 may be mounted to a position in the cockpit remote from frame 12, and the coupling of sensor 18 would be an optical coupling by the contact of the optical beam with frame 12. Preferably, however, sensor 18 comprises one or more suitable sensing devices, such as microswitches, mounted to frame 12. The number of switches or other sensors necessary for sensor 18 is dependent upon the number of frame positions provided by system 10. For example, if system 10 has only two frame positions, a single switch may be sufficient to detect both frame positions by signaling one position with an open-switch state and the other position with a closed-switch state. Likewise, each position may have its own contact switch, which is preferable if system 10 has more than two frame positions. In the preferred embodiment, sensor 18 comprises two contact switches 126 and 128 disposed on system 10 adjacent back region 38 of frame 12. Switch 126 may be located on top portion 82 of U-shaped bracket 80 to contact frame 12 when frame 12 is in the upper position. Similarly, switch 128 may be disposed on a pedestal 130 located on bottom portion 84 of U-shaped bracket 80 to contact frame 12 when frame 12 is in the lower position. Alternately, an optical sensor mounted to U-shaped bracket 80 may be used to sense the position of frame 12. With an optical sensor, system 10 may be designed to provide frame 12 with a continuum of possible positions between top 82 and bottom 84 portions of U-shaped bracket 80.

The effect of changing the position of frame 12 on the position of the HUD eyebox is illustrated in FIG. 7. The path of a light ray projected by optical unit 16 with the frame in an upper position is shown as a solid line at 132. The eyebox from which this image would be visible within the cockpit is shown in solid lines at 134. Next, the path of a light ray projected by optical unit 16 with the frame in a lower position is shown in dashed lines at 132', and the corresponding eyebox at 134'. Moving back region 38 of frame 12 downward rotates combiner 14 forward and upward so that the image is reflected to a lower point in the cockpit. Thus, pivoting back region 38 of frame 12 downward lowers the location of eyebox 134 in the cockpit, and makes the image on combiner 14 viewable by shorter pilots or from lower seat positions.

Figure 9:
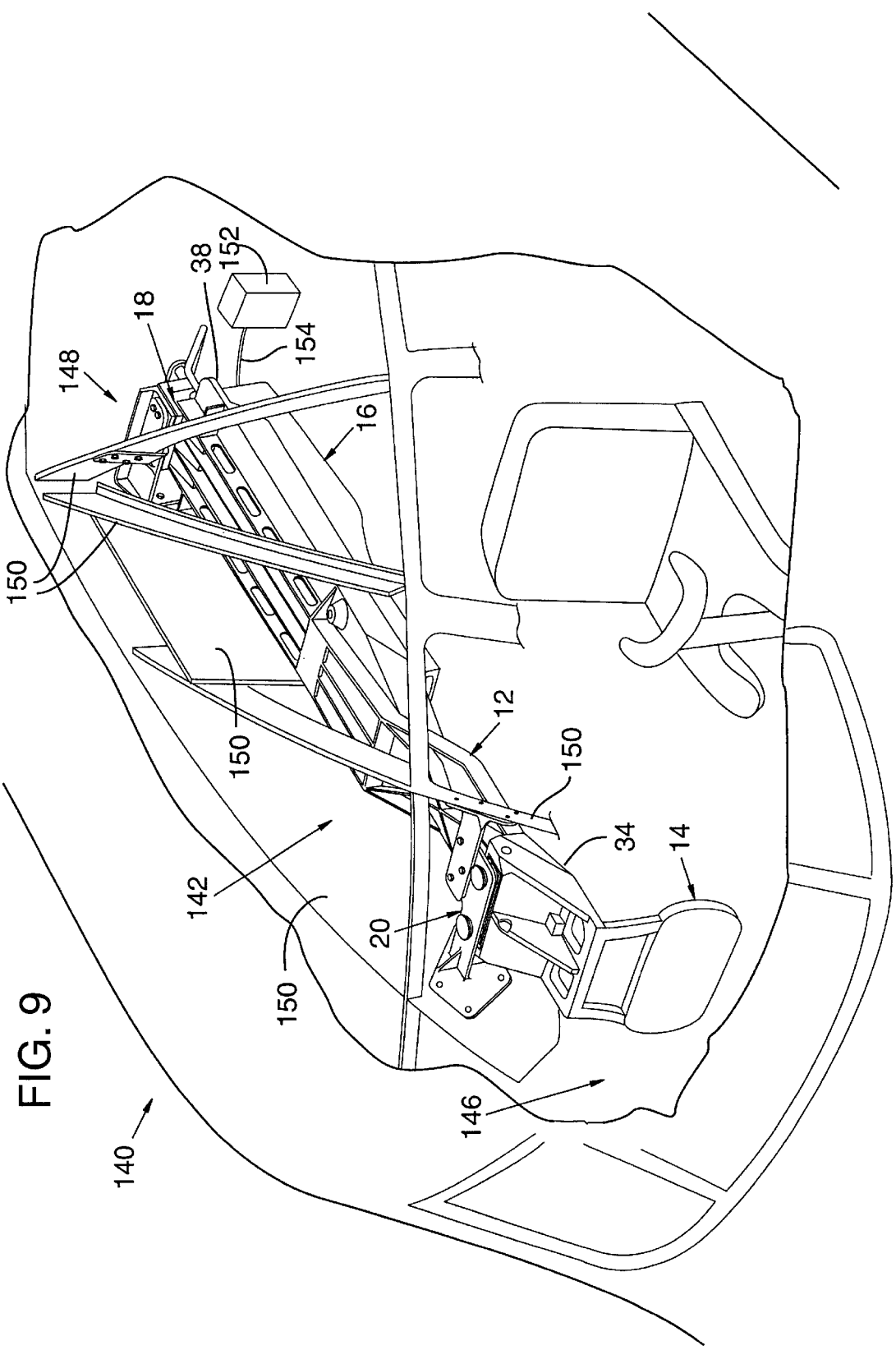
FIG. 9 is a cutaway view of the cockpit region of the aircraft of the embodiment of FIG. 8.

Another aspect of the present invention provides an aircraft with at least one adjustable HUD system positioned in the cockpit. FIG. 8 shows an aircraft according to the present invention generally at 140. Aircraft 140 has a cockpit 142, shown in more detail in FIG. 9, that includes a pilot's seat 144. System 10 is mounted in cockpit 142 such that front region 34 of frame 12 is situated within a front region 146 of cockpit 140, and back region 38 of frame 12 is situated within a back region 148 of cockpit 140. System 10 is mounted to structural members in the aircraft frame, such as member 150, with front mounting bracket 44 and rear mounting bracket 112. The positioning of system 10 within cockpit 142 places optical unit 16 over pilot's seat 144, and combiner 14 in the correct location so that the eyebox is positioned approximately at the location of a pilot's eyes. An HUD computer 152 is positioned in cockpit 142 at a location remote from system 10, and is connected to optics unit 16 with a suitable cable 154. The position of system 10 may be adjusted simply by pulling pin handle 100 to disengage pins 92 from positioning holes 90 and moving frame 12 to the desired position with frame handle 110. Pins 92 will be pushed into the positioning holes 90 that correspond to the new position by leaf spring 102, automatically locking frame 12 in the new position.

When installing system 10 into aircraft 140, care must be taken to ensure that frame 12 is aligned with the boresight axis of aircraft 140 in each position. Any suitable procedure for installing system 10 that allows frame 12 to be precisely aligned in each position may be used. One example of a suitable procedure that uses a target outside the aircraft to align frame 12 is illustrated in FIGS. 10–11. FIG. 10 shows a schematic diagram of equipment that may be used to align frame 12, including a frame alignment tool 156 and a target 160. Frame alignment tool 156 may be attached to frame 12 at the optics unit interface 36, and includes a telescopic sight 158. Target 160 is positioned along the boresight axis of aircraft 140 in front of cockpit 142 such that frame 12 may be aligned with target 160 using frame alignment tool 156. In the preferred embodiment, target 160 has two alignment patterns so that the target may be used to align both pilot's and copilot's frames without repositioning.

A flowchart showing typical steps in a frame alignment process is shown at 170 in FIG. 11. First, at 172, a boresight reference direction is established for aircraft 140 so target 160 can be positioned. Any suitable method known in the art may be used for establishing this direction. For example, the aircraft may be jacked and leveled, and then boresighted with a fixed target, or an adjustable target may be positioned along the boresight axis by referencing special tools attached to basic aircraft reference positions. After the boresight direction is established, an alignment reference such as target 160 is positioned in front of the aircraft along the boresight direction at 174. Step 174 may be performed at any time prior to comparing the position of the frame and the alignment reference with frame alignment tool 156.

After the boresight reference direction is characterized, at least one mounting bracket for attaching frame 12 to cockpit 142 is installed in cockpit 142 at 176 by attaching the mounting bracket to an aircraft structural member in the cockpit. In the preferred embodiment, this step includes installing front mounting bracket 44 in cockpit 142 adjacent front region 146 of cockpit 142, and installing rear mounting bracket 112 in cockpit 142 adjacent back region 148 of cockpit 142. Installing at least one mounting bracket may also include attaching U-shaped locking structure 80 to rear bracket 112. The positions at which mounting brackets 44 and 112 are installed in cockpit 142 are determined by comparison with cockpit reference points. It is not necessary that these brackets are precisely aligned with the boresight reference direction, as the amount of play in the mounting structures of frame 12 described earlier allows the position of frame 12 to be adjusted to compensate for any misalignment of mounting brackets 44 and 112.

After front mounting bracket 44 and rear mounting bracket 112 have been installed, frame 12 is positioned adjacent the mounting bracket at 178 so that moving coupling structure 20 is positioned adjacent front mounting bracket 44. In the preferred embodiment, positioning frame 12 adjacent the mounting bracket includes placing movable coupling structure 20 adjacent front mounting bracket 44 so that bushings 70 extend through receptacles 58 in first mounting bracket 44. Step 178 may also include fixing caps 74 to bushings 70 so that bushings 70 are held in receptacles 58, but have some play so that the pitch, yaw and roll of frame 12 may be adjusted. Similarly, in the preferred embodiment, positioning frame 12 adjacent the mounting bracket includes placing inserts 96 into one set of positioning holes 90 in frame 12, and then placing pins 92 through U-shaped locking structure 80 and into inserts 96. Thus, frame 12 is coupled to rear mounting bracket 112 with pins 92, but also has some play relative to rear mounting bracket 112 due to the space between inserts 96 and the walls of positioning holes 90.

Next, frame alignment tool 156 is attached to frame 12 at 180, and then the position of frame 12 relative to target 160 is compared at 182. Frame 12 may then be moved at 184 relative to target 160, within the limits allowed by the loose fit of bushings 70 in receptacles 58 and of inserts 96 in holes 90, until frame 12 is in a rough alignment with target 160. The degree of variation of the rough alignment from the boresight axis is determined by factors including the amount of offset that may be electronically provided by offset circuit 43. After frame 12 is in rough alignment with target 160, frame 12 is fixed to front and rear support brackets 44 and 112 at 186 by adding epoxy between bushings 70 and receptacles 58, and between inserts 96 and the walls of holes 90, as described above. After this step, frame 12 may only be moved in a generally vertical direction relative to cockpit 142 by pivoting frame 12 about pivot bar 60, and may not be moved in other directions.

After frame 12 is fixed to front and rear mounting brackets 44 and 112, the frame is electronically brought into fine alignment at a first frame position by obtaining a first offset value that characterizes the misalignment of the frame relative to the boresight direction in that position at 188. In the preferred embodiment, step 188 may include adjusting offset circuit 43 to correspond to the obtained offset value so that offset circuit 43 provides an offset signal to optics unit 16. Any suitable mechanism for determining and setting the necessary offset may be used. For example, in the preferred embodiment, frame alignment tool 156 is used to measure the misalignment of frame 12 after it has been brought into coarse alignment with target 160. Offset circuit 43 may then be adjusted to correct for the measured misalignment. After the offset value has been obtained for the first frame position, the frame is moved to a second position at 190, and a second offset value corresponding to the degree of frame offset from the boresight axis is obtained at this position at 192. After the second offset value has been obtained, offset circuit 43 may be adjusted to provide the required offset for the second frame position. If system 10 has more than two frame positions, this procedure may be repeated to obtain an offset value corresponding to each position. Also, each obtaining step may include storing the obtained offset value in the HUD computer so that the computer may automatically adjust the offset for each frame position by providing a signal to offset circuit 43.

After each necessary offset value has been obtained and the offset circuit has been adjusted for each position, frame alignment tool 156 is detached from frame 12 at 194, and combiner 14 and optical unit 16 are attached to frame 12 at 196. Offset circuit 43 is then connected to optical unit 16 so that offset circuit 43 correctly adjusts the display on combiner 14 at each frame position.

Alternatively, frame 12 may be roughly aligned with the boresight axis of aircraft 140 without the use of target 160. Equipment known in the art as Advanced Boresight Equipment may be used to electronically characterize the pitch, yaw and roll of an aircraft by referencing measurements from a multi-axis gyro-sensor to various cockpit reference points. Then, the electronically determined pitch, yaw and roll of the aircraft may be transferred to the frame by nulling a second sensor attached to the frame with respect to the first sensor. Though it is possible to both roughly align and determine the offset for frame 12 using this equipment, preferably the Advanced Boresight Equipment is used to roughly align frame 12, and target 160 is used to determine the offset values for each frame position.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A system for mounting a head-up display in a cockpit of an aircraft, the cockpit including a front region and a back region, the head-up display including a computer adapted to process flight information, an optical unit adapted to project an image corresponding to the flight information processed by the computer, and a combiner adapted to display the image projected by the optical unit, the system comprising:

a frame with a front region and a back region, the frame including an optical unit interface for mounting the optical unit and a combiner interface for mounting the combiner, wherein the frame is adapted to be movably coupled to the cockpit such that the frame may be moved in a generally vertical direction between a plurality of positions relative to the cockpit; and at least one sensor coupled to the frame, wherein the sensor senses the position of the frame and provides a signal to the computer corresponding to the position of the frame so that the computer may adjust at least part of the image displayed on the combiner to correspond to the position of the frame.

2. The system of claim 1, wherein the frame includes a movable coupling structure adapted to be coupled to the cockpit so that the frame may be moved in a generally vertical direction between a plurality of positions relative to the cockpit after the frame is coupled to the cockpit.

3. The system of claim 2, wherein the movable coupling structure includes a pivot adapted to be coupled to the cockpit so that the frame may be pivoted in a generally vertical direction between a plurality of positions relative to the cockpit after the frame is coupled to the cockpit.

4. The system of claim 1, wherein the front region of the frame is mounted adjacent the front region of the cockpit, and the back region of the frame is mounted adjacent the back region of the cockpit.

5. The system of claim 4, wherein the combiner interface is disposed on the frame adjacent the front region of the frame, and wherein the optical unit interface is disposed on the frame adjacent the back region of the frame.

6. The system of claim 5, wherein the frame includes a pivot adapted to be coupled to the cockpit so that the frame may be pivoted between a plurality of positions relative to the cockpit, the pivot being disposed on the frame adjacent the front region of the frame.

7. The system of claim 6, wherein the pivot is disposed on the frame between the combiner interface and the back region of the frame such that pivoting the back region of the frame downward translates the combiner interface upward, and pivoting the back region of the frame upward translates the combiner interface downward.

8. The system of claim 1, wherein the sensor is coupled to the frame adjacent the back region of the frame so that the sensor senses the position of the frame by sensing the back region of the frame.

9. The system of claim 1, wherein the system includes a plurality of sensors coupled to the frame, and wherein one sensor senses the frame at each position.

10. The system of claim 9, wherein the plurality of sensors are contact sensors, and wherein the frame contacts one sensor at each position.

11. The system of claim 1, further comprising at least one stopping member configured to prevent the frame from being moved beyond a desired position.

12. The system of claim 1, further comprising at least one mounting bracket, wherein the mounting bracket may be attached to the aircraft inside the cockpit, and wherein the frame may be coupled to the mounting bracket to mount the frame to the aircraft.

13. The system of claim 12, the frame including a pivot, wherein the pivot may be attached to the mounting bracket to pivotally couple the frame to the aircraft.

14. The system of claim 13, wherein the system includes a first mounting bracket and a second mounting bracket, the first mounting bracket being adapted to be attached to the aircraft in the cockpit adjacent the front region of the cockpit, the second mounting bracket being adapted to be attached to the aircraft in the cockpit adjacent the back region of the cockpit, wherein the pivot may be attached to the first mounting bracket.

15. The system of claim 1, further comprising a locking structure to lock the frame in each position, wherein the locking structure may be moved between a locked position and an unlocked position.

16. The system of claim 15, the frame including at least one recess corresponding to each position, wherein the locking structure includes at least one pin that extends into the recess in the frame when in the locked position to lock the frame in each position.

17. The system of claim 16, wherein the frame includes two recesses corresponding to each position, and wherein the locking structure includes two pins such that one pin extends into each recess when in the locking structure is in the locked position to lock the frame in each position.

18. The system of claim 15, wherein the locking structure includes a tensioning member that urges the locking structure into the locked position.

19. The system of claim 18, wherein the tensioning member is a spring.

20. The system of claim 1, further comprising a counterbalance coupled to the frame to facilitate movement of the frame between positions.

21. The system of claim 20, wherein the counterbalance is a compression spring coupled to the frame.

22. The system of claim 1, further comprising an offset circuit disposed on the frame, wherein the offset circuit is adapted to be connected to the optical unit and to provide an offset value to the optical unit so that the optical unit may adjust the image to correspond to the position of the frame.

23. An aircraft, the aircraft including a cockpit, the cockpit including a head-up display system, the head-up display system comprising:

a frame movably mounted to the aircraft in the cockpit, wherein the frame may be moved in a generally vertical direction between a plurality of positions relative to the cockpit;

a computer disposed in the aircraft, wherein the computer is configured to process aircraft flight data;

an optical unit mounted to the frame, wherein the optical unit is configured to project an image corresponding to the processed flight data;

a combiner mounted to the frame, wherein the combiner is adapted to display the image projected by the optical unit; and at least one sensor coupled to the frame, wherein the sensor is adapted to sense the position of the frame and to provide a signal to the computer so that the computer may adjust the image to correspond to the position of the frame.

24. A method of installing a head-up display unit in a cockpit of an aircraft, the display unit including a frame, an optical unit for projecting an image of flight information, a combiner for displaying the image, and a computer, the frame including a movable coupling structure and at least one electronic offset circuit to characterize a frame offset, the method comprising:

establishing a reference direction for the head-up display;

positioning an alignment reference such that the alignment reference is in a position in front of the aircraft along the reference direction;

installing at least one mounting bracket in the cockpit;

positioning the frame in the mounting bracket such that the movable coupling structure is at a position adjacent the mounting bracket;

attaching a frame alignment tool to the frame;

comparing the position of the frame and the position of the alignment reference using the frame alignment tool;

moving the frame until the frame is in a coarse alignment with the alignment reference;

fixing the movable coupling structure to the support bracket such the frame may be moved in a generally vertical direction between a plurality of vertical positions relative to the cockpit, but may not be moved in other directions;

obtaining a first offset value that characterizes a misalignment of the frame relative to the reference direction while the frame is in a first vertical position, and adjusting the offset circuit to correspond to the first offset valve;

storing the first offset valve in the computer;

moving the frame to a second position;

obtaining a second offset value that characterizes the misalignment of the frame at the second vertical position, and adjusting the offset circuit to correspond to the second offset valve;

storing the second offset valve in the computer;

detaching the frame alignment tool from the frame; and attaching the combiner and optical unit to the frame.

25. The method of claim 24, the cockpit including a front region and a back region, wherein installing at least one mounting bracket in the cockpit includes installing a front mounting bracket in the cockpit adjacent the front region of the cockpit, and installing a rear mounting bracket in the cockpit adjacent the back region of the cockpit.

26. The method of claim 24, further comprising moving the frame sequentially to a plurality of positions, and obtaining offset values that characterize the misalignment of the frame at each position.

* * * * *